(12) United States Patent
Maj et al.

(10) Patent No.: US 7,634,890 B2
(45) Date of Patent: Dec. 22, 2009

(54) TOWER SEGMENT ERECTION TOOL AND METHOD OF ERECTING A TOWER SEGMENT

(75) Inventors: Karl Aage Maj, Brande (DK); Poul Skjærbæk, Videbaek (DK)

(73) Assignee: Siemens Aktiengesellschaft, Munich (DE)

( * ) Notice: Subject to any disclaimer, the term of this patent is extended or adjusted under 35 U.S.C. 154(b) by 85 days.

(21) Appl. No.: 12/080,192

(22) Filed: Apr. 1, 2008

(65) Prior Publication Data

US 2008/0245029 A1  Oct. 9, 2008

(30) Foreign Application Priority Data

Apr. 4, 2007  (EP)  .................... 07007129

(51) Int. Cl.
- *E04D 15/00* (2006.01)
- *B66C 23/06* (2006.01)
- *E04G 21/14* (2006.01)
- *A01G 23/02* (2006.01)

(52) U.S. Cl. .......................... 52/749.1; 52/111; 414/10; 414/23

(58) Field of Classification Search .................. 52/120, 52/122.1, 123.1, 745.11, 749.1; 29/559, 29/897; 269/136, 139; 414/10, 23, 768
See application file for complete search history.

(56) References Cited

U.S. PATENT DOCUMENTS

| | | | |
|---|---|---|---|
| 852,877 A | * | 5/1907 | Downey ........................ 414/23 |
| 4,362,451 A | * | 12/1982 | Thiermann, Sr. .............. 414/23 |
| 4,371,046 A | * | 2/1983 | Read ............................. 175/57 |
| 4,621,972 A | * | 11/1986 | Grotte ........................... 414/477 |
| 6,408,575 B1 | | 6/2002 | Yoshida et al. |
| 6,782,667 B2 | | 8/2004 | Henderson |

FOREIGN PATENT DOCUMENTS

FR  2064331  A1  7/1971

* cited by examiner

*Primary Examiner*—Richard E Chilcot, Jr.
*Assistant Examiner*—Benjamin Pevarski

(57) ABSTRACT

A tower segment erection tool having a frame with a first side, a second side showing in the opposite direction than the first side and a holding mechanism for holding the frame with its first side at the bottom of a tower segment to be erected. A first support element adjoins the frame's second side such that it is located substantially under a section of the tower segment's peripheral wall when the tool is attached to the tower segment to be erected. The first support element has a curved surface allowing a rolling motion of the tower segment erection tool A second support element adjoins the frame's second side and has a foot that is spaced from the curved surface of the first support element such that it is located substantially in the tower segment's centre axis and that it is further away from the tower segment's bottom in a direction parallel to the tower segment's centre axis than the curved surface when the tower segment erection tool is attached to the tower segment to be erected. The curvature of the first support element's curved surface is such that during erection of the tower segment the tower segment erection tool rolls about the curved surface until the foot of the second support element touches the ground.

16 Claims, 5 Drawing Sheets

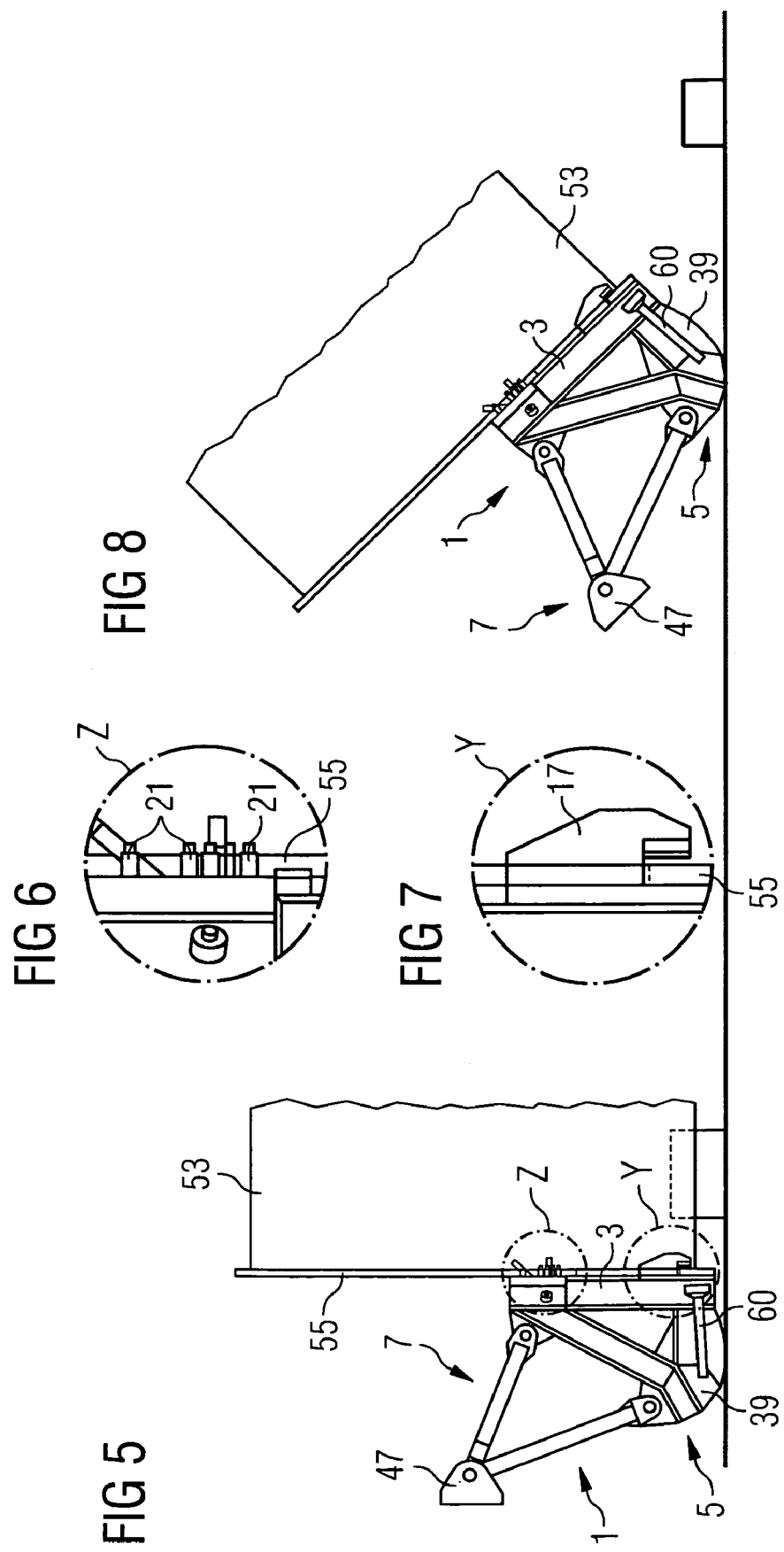

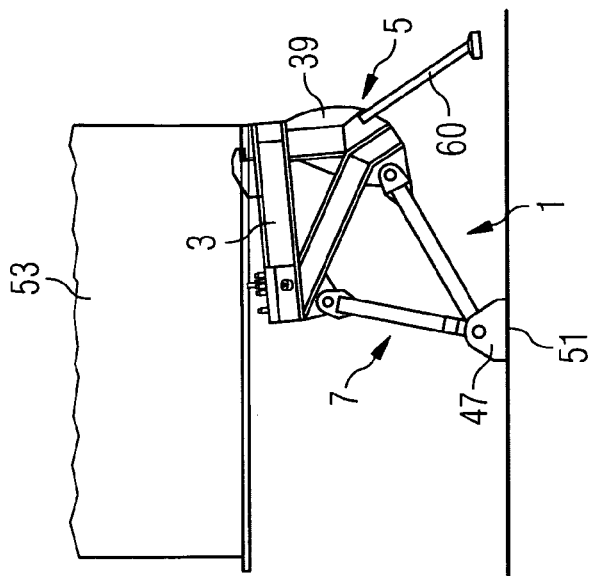
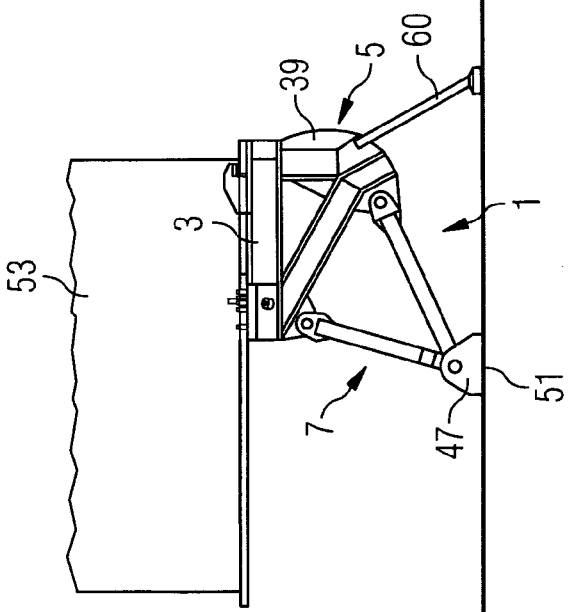
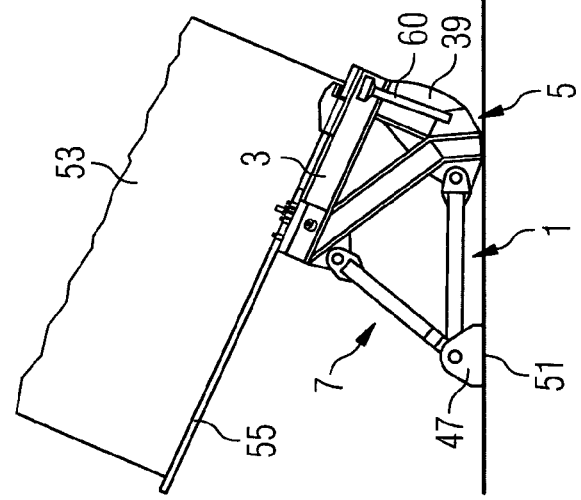

TOWER SEGMENT ERECTION TOOL AND METHOD OF ERECTING A TOWER SEGMENT

CROSS REFERENCE TO RELATED APPLICATIONS

This application claims priority of European Patent Office application No. 07007129.5 EP filed Apr. 4, 2007, which is incorporated by reference herein in its entirety.

FIELD OF INVENTION

The present invention relates to a tower segment erection tool and a method of erecting a tower segment. Under the expression "tower segment" either a whole tower or part of a tower shall be understood. In particular, the tower segment erection tool and the method can be used for erecting wind turbine towers or tower segments thereof.

BACKGROUND OF INVENTION

For erecting a wind turbine tower usually two cranes are needed to keep the moment of tilt under control when the tower reaches the vertical position. Just before reaching the vertical position the moment acting on the tower induced by gravitational force acts on a side of the tower and tends to tilt it in a more horizontal position. When reaching the vertical position, the tower may swing over. Such a swing over could lead to a dangerous swinging of the tower. Furthermore, it could induce unwanted loads onto the tower. Usually therefore a second crane is used to keep the tower under control and to prevent it from swinging due to the tilt moment. The first crane would be attached to the flange at the top of the tower, the second crane to the bottom flange of the tower. Then, the first crane would raise the top of the tower and second crane would keep the bottom of the tower clear of the ground. When the tower is hanging in an upright position, a technician needs to move under the hanging tower to remove the hook or lifting bracket(s) from the bottom flange. However, it would be desirable to use only one crane to erect the tower and thereby save the direct and indirect costs of the second crane. In particular, it would be desirable to overcome the need for the crane at the bottom end of the tower.

U.S. Pat. No. 6,408,575 B1 and U.S. Pat. No. 6,782,667 B2 describe methods for erecting wind turbine towers which are pivotably connected to a base foundation. These towers could, in principle, be erected with only one crane. However, the hinge at which a tower is pivotably connected to the foundation and the foundation itself would experience considerable loads during the erection of the tower. In particular, the load at the moment of swing over would lead to rather high forces on the hinge entailing the risk of damaging the hinge.

SUMMARY OF INVENTION

It is therefore an objective of the present invention to provide a tool and an improved method by which a tower or tower segment can be erected without the need of a second crane.

This objective is solved by a tower segment erection tool, as claimed in an independent claim, and by a method of erecting a tower segment as claimed in a further independent claim. The depending claims define further developments of the invention.

An inventive tower segment erection tool comprises a frame with a first side, a second side showing in the opposite direction than the first side and a holding mechanism for holding the frame with its first side at the bottom of the tower segment to be erected when it is attached to the segment's bottom. The tool further comprises a first support element and a second support element both of which adjoin the frame's second side. The first support element adjoins the second side such that it is located substantially under a section of the tower segment's peripheral wall when the tool is attached to the tower segment to be erected and which has a curved surface allowing a rolling motion of the tool. The second support element has a foot that is spaced from the curved surface of the first support element such that it is located substantially in the tower segment's centre axis and that it is further away from the tower segment's bottom in a direction parallel to the tower segment's centre axis as the curved surface when the tool is attached to the tower segment to be erected. The curvature of the first support element's curved surface is such that during erection of the tower segment the tool rolls about the curved surface until the foot of the second support element touches the ground.

The inventive tower segment erection tool overcomes the need for a second crane for erecting the tower segment; in particular it overcomes the need for the crane that is attached to the bottom of the tower segment. Instead of the second crane, the tower segment erection tool is attached to the bottom of the tower segment. The tool then controls the motion of the bottom of the tower segment. When the tower segment is erected to an angle with respect to the ground which is given by the distance the foot is further away from the bottom than the curved surface it provides slight resistance towards a further turning movement of the tower segment, i.e. a further erection of the tower which prevents the tower segment from overshooting its horizontal position. For the beginning of the erection the crane fixed to the tower top needs a relatively high force as the torque at the tower top is rather high if the tower is in a horizontal position. The further the tower is erected the smaller the force becomes which is needed for further erecting of the tower. By the resistance which is provided by the foot, the erection can be stopped in a semi-erected position at an angle at which the force for further erecting the tower is considerably lower than at the beginning of erection. After the tower has been brought into the semi-erected position, the crane can apply a considerably lower force for tilting the tower further. This lower force also provides a higher degree of control to the movement of the tower so that it can be prevented from overshooting the upright position.

Hence, the inventive method of erecting a tower segment by means of an inventive tower segment erection tool comprises the steps of:

Attaching the frame of an inventive tower segment erection tool to the bottom of the tower segment when the tower segment is in a horizontal or a near horizontal position, in particular when it rests on the ground. Then, the tower segment erection tool is rolled about the curved surface of the first support element by erecting the tower segment, i.e. by using the crane, until the foot of the second support element touches the ground. Then, the tower segment is further erected until it reaches an upright position. This further erecting can be done with a lower force than applied at the initial stage of erecting the tower. With the inventive method, the risk of the tower swinging over and being a potential danger can be reduced.

In order to attach the tower segment erection tool to a flange of the bottom of the tower segment to be erected, the holding mechanism can comprise at least one hook which is located such that it can hook into a flange at the bottom of the tower segment. It is also possible that the holding mechanism comprises at least one pin which is adapted to and located such as to allow it to be introduced into a hole in the flange. Holes in the flange are usually present for fixing the bottom of the tower to a base foundation using screws. Preferably, at least one hook as well as at least one pin are present in the holding mechanism. In addition to the pin, the holding mechanism can comprise at least one gripping unit which is adapted to and located such at the frame as to engage the flange from the opposite side than the at least one pin when the tool is attached to a tower segment. By this measure, slipping of the pin of the flange's hole when the tower is erected can be prevented.

It is possible to make the engagement of the gripping unit self-releasing if the holding mechanism includes a counter weight acting on the at least one gripping unit such that the gripping unit stops engaging the flange, at the latest, when the tower segment to be erected is in an upright position. This means that such a counter weight would be located such in the holding mechanism that it can move as the tower segment is erected. Its connection to the gripping unit would then be such that it acts on the gripping unit for a releasing movement of the gripping unit as soon as the counter weight reaches a certain position.

In particular, when the holding mechanism includes the counter weight for self-releasing the grip of the gripping unit it becomes possible to dismantle the tower segment erection tool from the bottom of the tower segment by action of the crane alone. By lifting the tower a small distance above the ground, the pin can slip out of the hole of the flange since the gripping unit has already released its grip due to the action of the counter weight. Then, turning the crane slightly can make the hook release the flange. Therefore, it is not necessary that a technician moves under the erected tower segment to dismantle the tool.

In order to prevent the tower segment erection tool from falling over about the curved surface as soon as it is released from the tower segment, at least one leg my be present which is pivotably connected to the frame or a support element such that it is pivotable from a first position in which it does not hinder the erection of the tower segment to a second position in which it provides a firm standing of the tool together with the second support element and after the tool is dismantled from an erected tower segment. Such a leg can be pivoted such that it rest on the ground when the tower segment is fully erected but before the tool is released from the bottom of the tower segment. The pivoting could be done remotely, e.g. by the use of remotely controllable motors or just by using ropes etc. However, since the tower is not freely swinging before the tool is released, it would also be possible that a technician pivots the leg by hand.

In addition, it is advantageous if the leg is adjustable in length. This would provide the possibility of adjusting the leg to ground level.

The foot of the second support element may include a support face which is rotatable about an axis that is parallel or identical to an axis about which the tower is rotated when it is erected. This face allows the foot to safely rest on the ground although the tower segment is tilted, i.e. further erected. However, a curved surface of the foot or a roll instead of the rotatable face is also possible.

Since the dimension of the tower segment erection tool also depends on the dimension of the tower segment to be erected, in particular on its diameter, the tool can be rather large if it is designed to be used for erecting large tower segments, in particular tower segments having a large diameter. In this case it may be advantageous, in view of transportation of the tower segment erection tool, if it comprises two parts which are combinable with each other to become the tool.

BRIEF DESCRIPTION OF THE DRAWINGS

Further features, properties and advantages of the inventive tower segment erection tool and the inventive method will become clear from the following description of embodiments of the invention in conjunction with the accompanying drawings.

FIGS. 5 to 11 show different stages of the erection of a tower segment using the inventive tower segment erection tool.

DETAILED DESCRIPTION OF INVENTION

An exemplary embodiment of the inventive tower segment erection tool will now be described with respect to FIGS. 1 to 4.

Figure 1:
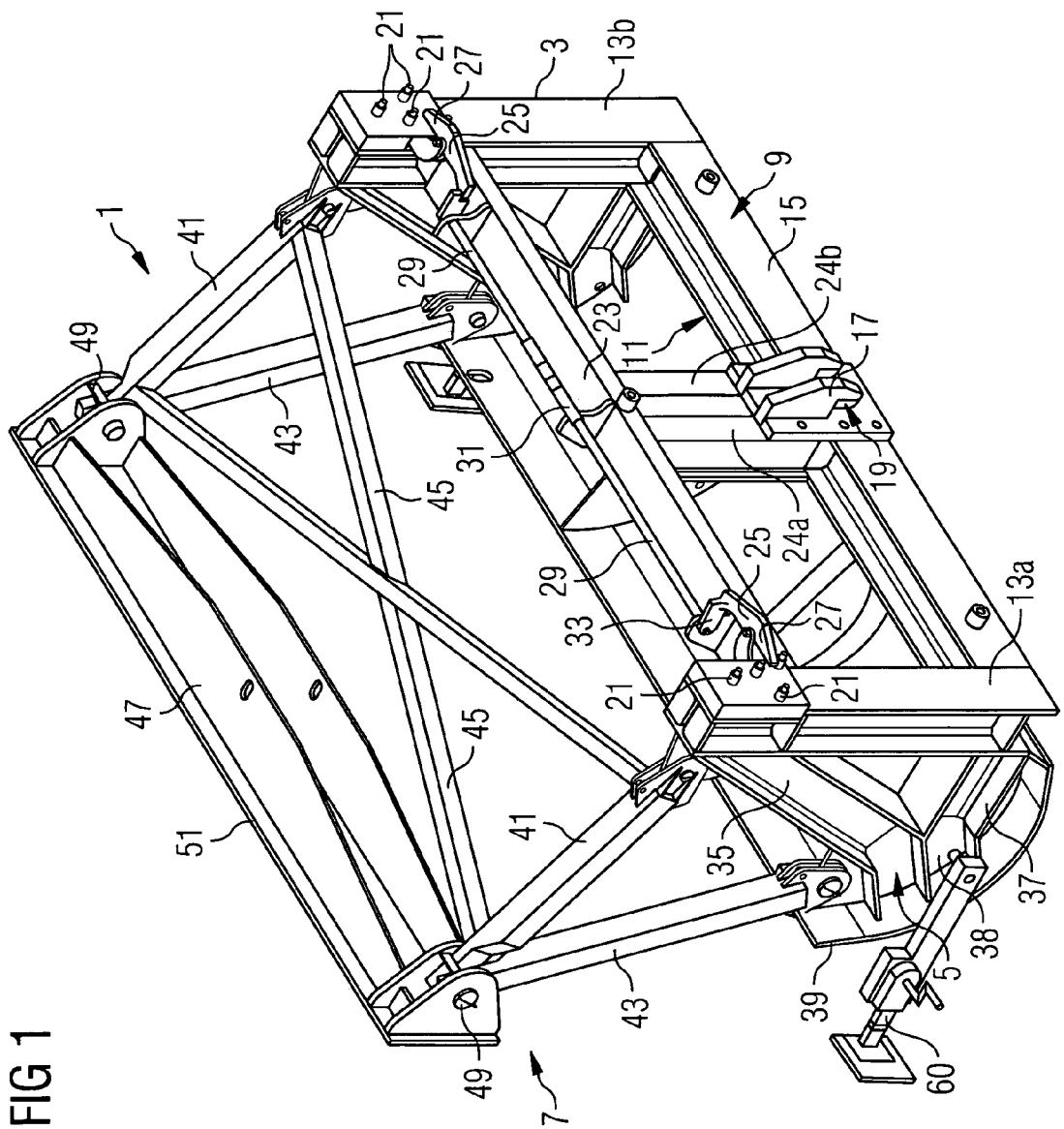
FIG. 1 shows an inventive tower segment erection tool in a perspective view.
Figure 3:
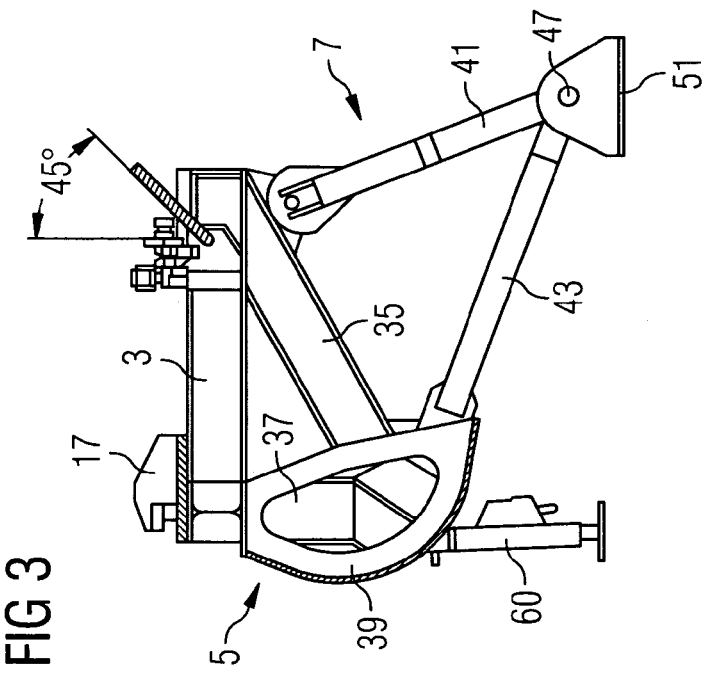
FIG. 3 shows a cut through the tool as indicated by A-A in FIG. 2.
Figure 2:
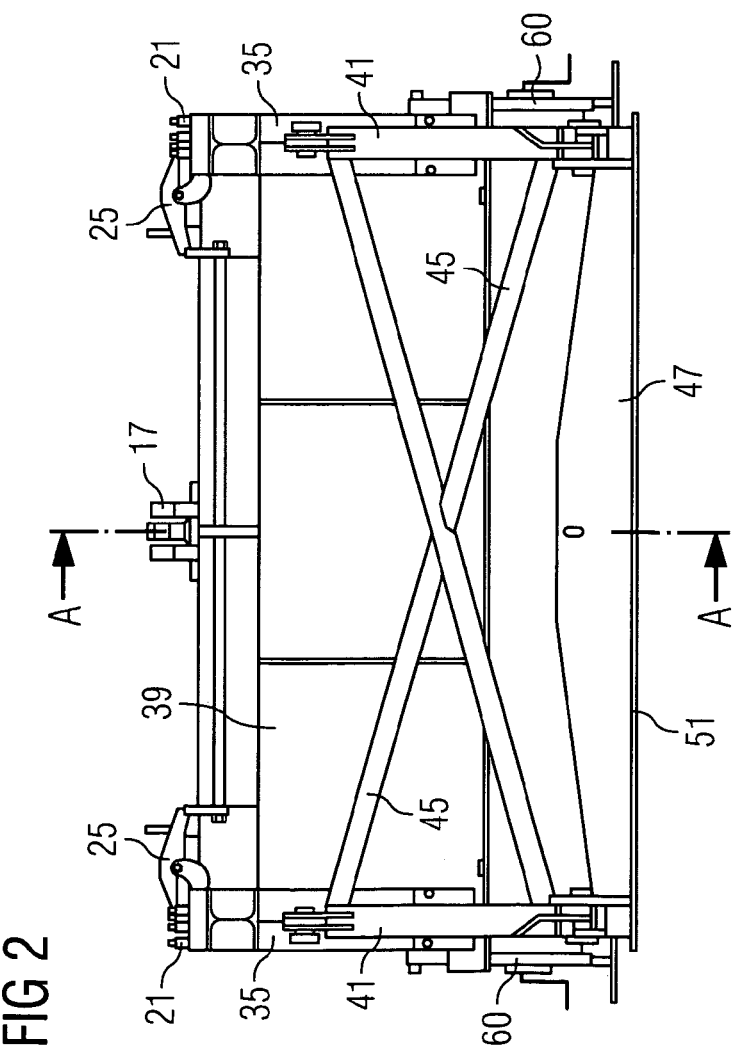
FIG. 2 shows the tool of FIG. 1 in a side view.
Figure 4:
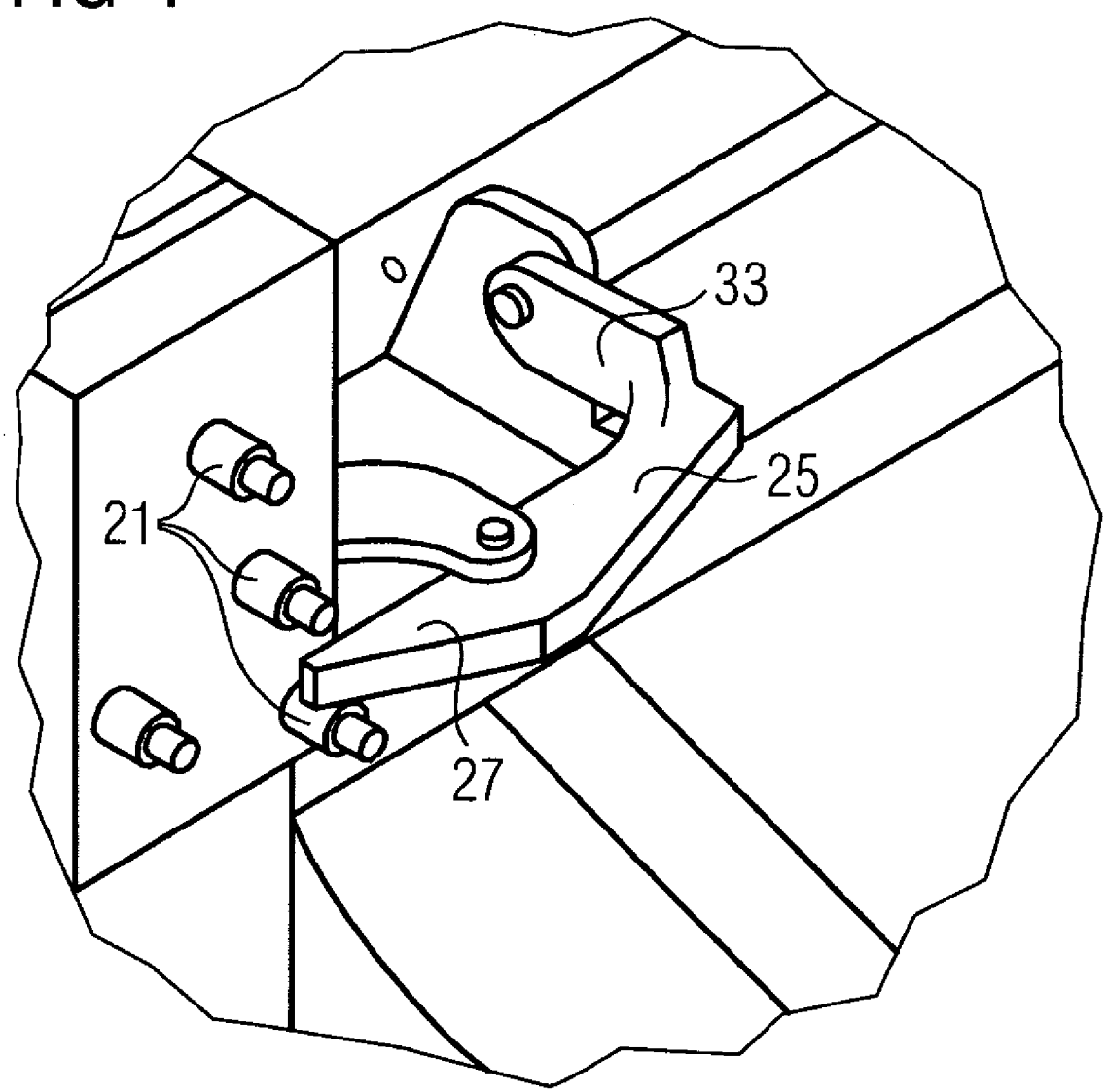
FIG. 4 shows detail of the tool.

FIG. 1 shows the tower segment erection tool 1 in a position in which it will be for attaching it to the bottom of a tower segment to be erected. The tower segment erection tool 1 comprises a frame 3, a first support element 5 and a second support element 7. The frame 3 has a first side 9 which is to be attached to the bottom of the tower segment 53 to be erected (compare FIG. 5) and a second side 11 which shows away from the bottom of the tower segment 53 when the tool 1 is attached to the bottom. The first support element 5 and the second support element 7 both adjoin the frame 3 at its second side 11.

The frame 3 is, in the present embodiment, formed by two double T-beams 13a, 13b which are connected by a first crossbeam 15. The crossbeam is also implemented as a double T-beam. A second crossbeam 23 and two interconnecting beams 24a, 24b connecting both crossbeams 15, 23 stabilise the frame 3.

A double hook 17 is fixed to the first crossbeam 15 in its centre part so that the openings 19 of the double hook show towards the outside of the frame 3. The hook 17 is located such and its opening is dimensioned such that it can hook onto the flange at the bottom of a tower segment.

Both double T-beams 13a, 13b are equipped with a number of pins 21 which project over the first side 9 of the frame 3. The pins 21 are dimensioned such and are located such that they can be introduced into through holes of the flange by which the flange can be fixed to a base foundation after the tower segment is erected.

The frame 3 further comprises gripping units 25 which are moveably mounted with respect to the double T-beams 13a, 13b so that a front part can be moved over the bottom flange of the tower segment when the pins 21 are introduced into the flange holes. When the tower segment erection tool 1 is in the position shown in FIG. 1, the gripping unit 25 can be secured against a releasing movement by a counter weight 31 acting on plates 33 of the gripping units 25 via rods 29 which extend parallel to the second crossbeam 23. When the tower segment erection tool 1 is turned by 45°, the counter weight 31 swings over which leads to a releasing movement of the rods 29 with respect to the plates 33. This releasing movement ends the blocking of the gripping units 25 so that they can disengage from the flange.

The first support element 5 is fixed to the frame 3 via two double T-beams 35, 37 which combine to form a common section 38. A curved steel plate 39 is fixed to the common section 38. This steel plate 39 forms a rolling surface which allows a rolling movement of the tool when the tower segment attached to the tool is erected.

The second support element 7 is attached via first beams 41 to the frame 3 and via second beams 43 to the common section 38 of the first support element 5. The first beams 41 are further stabilised by two crossing beams 45. A foot 47 is attached to the beams 41, 43 by articulated joints 49 where the first beams 41 and the second beams 43 meet. The foot 47 has a plane support face 51. Although the foot 47 is attached to the beams 41, 43 by articulated joints 49, it may also be fixedly attached to the beams. In this case, it is advantageous if the foot's support surface 51 is curved or the foot is implemented as a roll or a cylinder.

Legs 60 are attached to the common section 38 of the double T-beams 35, 37 by means of an articulated joint. In the present embodiment, the legs are implemented as adjustable jacks which allow the legs to be adjusted to ground level. The legs are shown in FIG. 1 in a first position where they do not hinder a revolution of the wind turbine erection tool 1 about the curved surface 39. However, when the tower segment erection tool is in the positions shown in FIGS. 2 and 3 the legs 60 may be turned towards the ground and adjusted to ground level.

The erection of a tower segment by the use of the inventive tower segment erection tool will now be described with respect to FIGS. 5 to 11. These figures exemplary show the erection of a wind turbine tower 53 as a tower segment. The wind turbine tower 53 is equipped with a flange 55 at its bottom end. The flange 55 extends radially outwards of the tower's wall as well as radially inwards.

In a first step of the inventive method of erecting the wind turbine tower 53, the tower segment erection tool 1 is attached to the flange 55 at the bottom end of the wind turbine tower 53 when the wind turbine tower 53 is in a horizontal position, e.g. when it is lying on the ground. Attaching the tool to the flange 55 can be aided by the crane which will later be used for erecting the wind turbine tower 53. However, an additional small crane can be used as well as a person skilled in the art will understand.

When attaching the tower segment erection tool 1 to the flange 55, its hook 17 is hooked onto the radial inner part of the flange 55 (see FIG. 7). In addition, the pins 21 are introduced into through holes which are present in the flange 55 for fixing the erected tower 53 to a base foundation by screws. The pins 21 can either be introduced into holes in the radial outer part of the flange or the radial inner part of the flange or in both parts of the flange (compare FIG. 6).

After introducing the pins 21 into the through holes the gripping units 25 are moved over the radial inner part of the flange at the location where the pins 21 are introduced into the through holes so as to prevent the tool 1 from slipping out of the holes when erection of the tower starts. The gripping units 25 may be moved over the flange 55 by hand and secured afterwards by means of the moveable counter weight.

After the tower segment erection tool 1 has been attached to the flange 55 of the wind turbine tower 53, a crane (not shown) which is attached to the top part of the wind turbine tower 53 starts erecting the wind turbine tower. In this stage, which is shown in FIG. 8, the curved steel plate 39 of the first support element 5 acts as a big roll for part of a revolution, i.e. for a part of the tilting movement of the tower 53. The hook 17 absorbs the torque resulting from erecting the wind turbine tower 53 while the pins absorb the weight of the tower. When the wind turbine tower 53 reaches an angle of about 45°, as shown in FIG. 8, the counter weight 31 swings over and releases the gripping unit 25 so that they retract from the backside of the radial inner part of the flange 55. Then, for angles above 45°, the hook will also take up the weight of the tower 53, while the pins prevent a yawing movement of the tower 53.

When the wind turbine tower 53 reaches an angle of about 70° in the present embodiment the foot 47 touches the ground with its support face 51. This stage of the erection of the wind turbine tower is shown in FIG. 9. Further erecting the tower 53 then elevates the curved steel plate 39 of the first support element 5 above the ground. This system is made to avoid instability of the wind turbine tower's position when the centre of gravity passes over the point of rotation. For angles above 70° the axis about which the wind turbine tower is tilted moves from the first support element 5 to the foot 47 of the second support element 7. Since the dimensions of the tower segment erection tool 1 are chosen such that the centre axis of the tower 53 extends through or near the foot, the foot can support the tower 53 in a suitable manner until it is fully erected, as shown in FIG. 10.

When the tower has reached its upright position, legs 60 pivotably attached to the sides of the first support element 5 are turned towards the ground and adjusted to ground level by means of jacks integrated into the legs 60. Subsequently, the crane operator can lift the wind turbine tower 53 a bit further, as shown in FIG. 11, making the pins disengage from the flange 55. Following this, the crane operator can turn the crane slightly making the hook release the flange. Due to the legs 60, the tower section erection tool 1 stands on the ground without rolling towards the first support element 5.

After this, the wind turbine tower 53 can be moved to the base foundation. The tower segment erection tool 1 will be turned and loaded to a truck, e.g. by a small crane. Alternatively, the tower segment erection tool 1 can comprise two pieces, e.g. a first piece comprising the frame 3 and the first support element 5 and a second piece comprising the second support element 7. In this case both pieces can be disassembled which facilitates transportation. It then becomes possible to transport the parts, e.g. in standard containers. The hooks and the pins may be replaceable with other types of hooks and pins enabling the tool to be used for different flange sizes and/or tower sizes.

The invention claimed is:

1. A tower segment erection tool, comprising:
   a frame with a first side and a second side, the second side showing in the opposite direction than the first side;
   a holding mechanism for holding the frame with its first side at the bottom of a tower segment to be erected;
   a first support element which adjoins the frame's second side such that it is located substantially under a section of the tower segment's peripheral wall when the tool is attached to the tower segment to be erected and which has a curved surface allowing a rolling motion of the tower segment erection tool; and
   a second support element which adjoins the frame's second side and which has a foot that is spaced from the curved surface of the first support element such that it is located substantially in the tower segment's centre axis and that it is further away from the tower segment's bottom in a direction parallel to the tower segment's centre axis than the curved surface when the tower segment erection tool is attached to the tower segment to be erected, wherein a curvature of the first support element's curved surface is such that during erection of the tower segment the tower segment erection tool rolls about the curved surface until the foot of the second support element touches the ground.

2. The tower segment erection tool as claimed in claim 1, wherein the holding mechanism comprises at least one hook which is located such that it hooks into a flange at the bottom of the tower segment to be erected.

3. The tower segment erection tool as claimed in claim 1, wherein the holding mechanism comprises at least one pin which is adapted to and located such as to allow to be introduced into a hole in the flange.

4. The tower segment erection tool as claimed in claim 3, wherein the holding mechanism comprises at least one gripping unit which is adapted to and located such at the frame as to engage the flange from the opposite side than the at least one pin when the tower segment erection tool is attached to a tower segment.

5. The tower segment erection tool as claimed in claim 4, wherein the holding mechanism includes a counter weight acting on the at least one gripping unit such that the gripping unit stops engaging the flange at the latest when the tower segment to be erected is in the upright position.

6. The tower segment erection tool as claimed in claim 1, wherein the foot of the second support element includes a support face which is rotatable about an axis that is parallel or identical to an axis about which the tower segment is rotated when it is erected.

7. The tower segment erection tool as claimed in claim 2, wherein the foot of the second support element includes a support face which is rotatable about an axis that is parallel or identical to an axis about which the tower segment is rotated when it is erected.

8. The tower segment erection tool as claimed in claim 3, wherein the foot of the second support element includes a support face which is rotatable about an axis that is parallel or identical to an axis about which the tower segment is rotated when it is erected.

9. The tower segment erection tool as claimed in claim 1, wherein at least one leg is present which is pivotably connected to the frame or a support element such that it is pivotable from a first position in which it does not hinder the erection of the tower segment to a second position in which it provides a firm standing of the tower segment erection tool together with the foot of the second support element after the tower segment erection tool is dismantled.

10. The tower segment erection tool as claimed in claim 2, wherein at least one leg is present which is pivotably connected to the frame or a support element such that it is pivotable from a first position in which it does not hinder the erection of the tower segment to a second position in which it provides a firm standing of the tower segment erection tool together with the foot of the second support element after the tower segment erection tool is dismantled.

11. The tower segment erection tool as claimed in claim 3, wherein at least one leg is present which is pivotably connected to the frame or a support element such that it is pivotable from a first position in which it does not hinder the erection of the tower segment to a second position in which it provides a firm standing of the tower segment erection tool together with the foot of the second support element after the tower segment erection tool is dismantled.

12. The tower segment erection tool as claimed in claim 1, wherein the length of the leg is adjustable.

13. The tower segment erection tool as claimed in claim 2, wherein the length of the leg is adjustable.

14. The tower segment erection tool as claimed in claim 3, wherein the length of the leg is adjustable.

15. The tower segment erection tool as claimed in claim 1, wherein comprises two parts which are combinable with each other.

16. A method of erecting a tower segment, comprising:
providing a tower segment erection tool having
a frame with a first side and a second side, the second side showing in the opposite direction than the first side,
a holding mechanism for holding the frame with its first side at the bottom of a tower segment to be erected,
a first support element which adjoins the frame's second side such that it is located substantially under a section of the tower segment's peripheral wall when the tool is attached to the tower segment to be erected and which has a curved surface allowing a rolling motion of the tower segment erection tool; and
a second support element which adjoins the frame's second side and which has a foot that is spaced from the curved surface of the first support element
attaching the frame of the tower segment erection tool to the bottom of the tower segment when the tower segment is in a horizontal position;
rolling the tower segment erection tool about the curved surface of the first support element by erecting the tower segment until the foot of the second support element touches the ground;
erecting the tower segment until it reaches an upright position; and
dismantling the frame from the bottom of the tower segment.

* * * * *